United States Patent Office 2,982,792
Patented May 2, 1961

2,982,792

PREPARATION OF NON-CONJUGATED CYCLOALKADIENES

Louis Schmerling, Riverside, Ill., assignor, by mesne assignments, to Universal Oil Products Company, Des Plaines, Ill., a corporation of Delaware No Drawing. Filed Jan. 28, 1957, Ser. No. 636,459

9 Claims. (Cl. 260—648)

This application is a continuation-in-part of my copending application Serial No. 455,089, filed September 9, 1954.

This invention relates to a process for preparing non-conjugated cycloalkadienes, and more particularly to a process for the preparation of 1,4-cyclohexadienes and their halogen substitution products.

It has now been discovered that non-conjugated cycloalkadienes and their halo-substituted derivatives, which were useful as intermediates in the preparation of many types of organic compounds such as insecticides, polymers, resins, etc., may be prepared by dehalogenation or partial dehalogenation of a polyhalocycloalkene containing at least 2 halogen atoms which has been obtained by the condensation of a conjugated alkadiene with a polyhaloalkene. For example, a halo-substituted cycloalkadiene such as 1-chloro-1,4-cyclohexadiene is prepared by reacting butadiene with trichloroethylene and partially dechlorinating the resultant 4,4,5-cyclohexene. This non-conjugated chlorocyclohexadiene may be condensed with hexachlorocyclopentadiene to form 2,5,6,7,8,9,9-heptachloro-1,4,4a,5,8,8a-hexahydro - 5,8 - methanonaphthalene which possesses relatively active insecticidal properties.

Heretofore, a non-conjugated cycloalkadiene such as 1,4-cyclohexadiene has been prepared by the dehydration of 1,4-cyclohexanediol which, in turn, was obtained by the hydrogenation of hydroquinone. The dehalogenation step resulted in a mixture of 1,3- and 1,4-cyclohexadienes which then had to be separated by fractional distillation. This fractional distillation is usually carried out with difficulty due to the fact that the boiling points of the isomers were only approximately 5.8° C. apart. The process of the present invention has overcome this difficulty by preparing pure non-conjugated cycloalkadienes by the hereinbefore set forth steps of condensing a conjugated alkadiene and a haloolefin containing at least one halogen atom on each of the doubly bonded carbon atoms, followed by dehalogenation or partial dehalogenation in the presence of a suitable dehalogenating agent.

It is therefore an object of this invention to prepare non-conjugated cycloalkadienes by dehalogenating the condensation product of the reaction between a conjugated alkadiene and a polyhaloalkene.

A more particular object is to prepare 1,4-cyclohexadienes or halo-substituted 1,4-cyclohexadienes by at least partially dehalogenating the condensation product of the reaction between a conjugated alkadiene such as butadiene and a polyhaloalkene.

One embodiment of this invention resides in a process for the preparation of a non-conjugated cycloalkadiene which comprises reacting a conjugated alkadiene with a polyhaloalkene having the general formula:

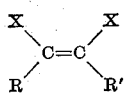

in which R and R are independently selected from the group consisting of hydrogen, halogen and alkyl radicals and X is a halogen radical, at least partially dehalogenating the resultant polyhalocycloalkene in the presence of a dehalogenating agent and recovering the resultant non-conjugated cycloalkadiene.

A specific embodiment of the invention resides in a process for the preparation of a non-conjugated cycloalkadiene which comprises reacting a conjugated alkadiene with a polyhaloalkene having the general formula:

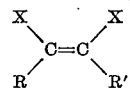

in which R and R' are independently selected from the group consisting of hydrogen, halogen and alkyl radicals and X is a halogen radical, at a temperature in the range of from about 40° to about 250° C., at least partially dehalogenating the resultant polyhalocycloalkene in the presence of magnesium and magnesium iodide, and recovering the resultant non-conjugated cycloalkadiene.

A more specific embodiment of the invention resides in a process for the preparation of 1,4-cyclohexadiene which comprises reacting butadiene with trans-dichloroethylene at a temperature in the range of from about 170° to about 210° C., at least partially dechlorinating the resultant trans-4,5-dichlorocyclohexene in the presence of magnesium and magnesium iodide in ether, and recovering the resultant 1,4-cyclohexadiene.

Other objects and embodiments of this invention referring to alternative conjugated cycloalkadienes and to alternative haloalkenes containing at least 1 halogen atom on each of the doubly bonded carbon atoms will be referred to in the following further detailed description of this invention.

The intermediate halogenated cycloalkenes are prepared by condensing a conjugated alkadiene such as butadiene, isoprene, 2,3-dimethyl-1,3-butadiene, 2,3-diethyl-1,3-butadiene, 1,3-pentadiene, 2,3-dimethyl-1,3-pentadiene, 2,3-diethyl-1,3-pentadiene, 1,2,3-trimethyl-1,3-pentadiene, 1,2,3-triethylpentadiene, 1,3-hexadiene, 2,4-hexadiene, 1,2-dimethyl-1,3-hexadiene, 2,3,5-trimethyl-1,3-hexadiene, 2,3-diethyl-1,3-hexadiene, 2,3,5-triethyl-1,3-hexadiene, 2,4-dimethyl-2,4-hexadiene, etc. with a polyhaloalkene having the formula:

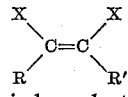

in which R and R' are independently selected from hydrogen, halogen and alkyl radicals and X is a halogen radical. The polyhaloalkenes which may be used in the process of this invention comprise haloalkenes in which a halogen, preferably chlorine or bromine (i.e., halogen having an atomic weight between about 35 and 80) is attached to each of the doubly bonded carbon atoms. These polyhaloalkenes include cis- and trans-1,2-dichloroethylene, trichloroethylene, 1,2-dichloro-1-propene, 1,1,2-trichloro-1-propene, 1,2-dibromo-1-propene, 1,1,2-tribromo-1-propene, 1,2-dichloro-1-butene, 1,1,2-trichloro-1-butene, 1,2-dibromo-1-butene, 1,1,2-tribromo-1-butene, 2,3-dichloro-2-butene, 2,3-dibromo-2-butene, 1,2-dichloro-1-pentene, 1,2-dibromo-1-pentene, 2,3-dichloro-2-pentene, 2,3-dibromo-2-pentene, 1,2-dichloro-1-hexene, 1,2-dibromo-1-hexene, 1,1,2-trichloro-1-hexene, 1,1,2-tribromo-1-hexene, 2,3-dichloro-2-hexene, 2,3-dibromo-2-hexene, 3,4-dichloro-3-hexene, 3,4-dibromo-3-hexene, etc. It is to be understood that the above mentioned conjugated alkadienes and polyhaloalkenes are only representatives of the class of compounds which may be used and that the process of the present invention is not necessarily limited thereto.

The condensation between the conjugated alkadiene and the polyhaloalkene having the aforementioned formula is effected at elevated temperatures in the range of from about 40° to about 250° C., and preferably in the range of from about 170° to about 210° C. The condensation process may be effected in any suitable manner and may be either a batch or continuous type operation. For example, when a batch type operation is used a quantity of the starting material comprising the conjugated alkadiene and the polyhaloalkene is placed in a reaction vessel equipped with heating and stirring means and heated to the desired temperature. After a predetermined residence time in the reactor, the reactor and contents thereof are cooled to room temperature and the halo-substituted cycloalkene is separated from the unreacted starting material by fractional distillation and dehalogenated by a process hereinafter described.

The condensation process between the conjugated alkadiene and the polyhaloalkene may also be effected in a continuous type operation. When such an operation is used, the starting materials are continuously charged through separate lines to a reactor which is maintained at the proper operating conditions of temperature and pressure, or may be admixed prior to entry into said reactor and charged thereto in a single stream. The reactor may comprise an unpacked vessel or coil or, may be lined with an adsorbent material such as fire brick, dehydrated bauxite, alumina and the like. After a predetermined residence time has been met the condensation product is continuously withdrawn, separated from the reactor effluent and purified by conventional means, while the unreacted starting materials may then be recycled to form a portion of the feed stock.

The dehalogenation or partial dehalogenation of the polyhalocycloalkene to form non-conjugated cycloalkadienes or halo-substituted non-conjugated cycloalkadienes may be accomplished in a number of ways, usually by treatment with a metal. A preferred method consists in treating the polyhalide with a magnesium metal and a catalytic amount of magnesium iodide or iodine in an organic solvent such as anhydrous ethyl ether. This reaction is carried out at atmospheric pressure and temperatures in the range of from about 0° to about 50° C., room temperature being preferred. Inasmuch as the reaction is exothermic in nature, cooling means must be provided in order that the temperature of the reaction be maintained at room temperature during the course of said reaction. Other dehalogenating agents which may be used include zinc or iron and an organic solvent including alcohols such as ethyl or propyl alcohol, or acetic acid, the preferred agent, as hereinbefore stated, comprising magnesium and magnesium iodide in an organic solvent.

The dehalogenation of the cycloalkene may also be effected in any suitable manner and may comprise either a batch or continuous type of operation. For example, when it is desired to dehalogenate a dihalocycloalkadiene in which the halogens are on adjacent carbon atoms in the ring, a quantity of the starting materials, namely, the magnesium metal and the organic solvent such as absolute ethyl ether are placed in a reaction vessel equipped with stirring means. Iodine is then added to the mixture to form the magnesium iodide essential to the reaction. A dihalocycloalkene is then slowly added to the reaction vessel while said vessel is maintained at the desired temperature. After a predetermined reaction time has elapsed, the desired product is separated from unreacted material and recovered by conventional means, for example, fractional distillation.

Another method of operation of the present process is of the continuous type. In this method of operation, the desired halocycloalkene and the iodine and absolute ether, along with the magnesium metal, are continuously charged to a reaction zone maintained at suitable operating conditions. The reaction zone may be an unpacked vessel or coil, or it may contain an adsorbent packing material such as fire brick, alumina, dehydrated bauxite, and the like. The dehalogenated non-conjugated cycloalkadiene is separated from the reactor effluent after a predetermined reaction time has elapsed, and the unconverted materials may be recycled to the reaction zone to form a portion of the starting material. A modification of the above mentioned process is found in the process of forming a magnesium iodide in situ in the organic solvent and then charging the resultant product to the reaction zone together with the dihalocycloalkene.

Examples of non-conjugated cycloalkadienes which may be prepared according to the process of this invention include 1,4-cyclohexadiene, 1-chloro-1,4-cyclohexadiene, trans-1,2-dichloro-1,4-cyclohexadiene, 1-bromo-1,4-cyclohexadiene, trans-1,2-dibromo-1,4-cyclohexadiene, etc.; 1-methyl-1,4-cyclohexadiene, 1-ethyl-1,4-cyclohexadiene, 1,2-dimethyl-1,4-cyclohexadiene, etc., and their halo-substituted derivatives, etc.

The following examples are given to illustrate the process of the present invention which, however, are not intended to limit the generally broad scope of the present invention in strict accordance therewith.

*Example I*

78 g. of butadiene and 200 g. of trans-dichloroethylene were placed in a glass liner of a rotating autoclave under 50 atmospheres of initial nitrogen pressure and heated to a temperature in the range of from about 170° to about 200° C. for a period of two hours. At the end of this time the autoclave was cooled to room temperature and the reaction mixture subjected to fractional distillation. A cut boiling at 182–183° C. was separated out. This cut crystallized on cooling to room temperature, said cut comprising trans-4,5-dichlorocyclohexene having a melting point of 45° C.

12 g. of iodine was added portion-wise to a stirred mixture of 18 g. of magnesium turnings in 400 cc. of absolute ether at room temperature. 51 g. of the trans-4,5-dichlorocyclohexene prepared by the hereinbefore stated method was slowly added to the stirred mixture. The stirring was continued for approximately 2.5 hours while the temperature was kept at approximately 30° C. At the end of this time, the stirring was stopped, the product was treated with water, and the ether layer was separated, washed, dried and distilled. There was obtained 14 g. of the reaction product boiling at 88–89° C. and having a refractive index, $n_D^{20}$, of 1.4724. It was checked for possible impurities by means of its infra-red spectrum. No 1,3-cyclohexadiene, benzene, cyclohexane or cyclohexene was detected.

*Example II*

80 g. of butadiene and 200 g. of trichloroethylene are placed in a glass liner of a rotating autoclave and subjected to operating conditions similar to those described in Example I above, namely, approximately 50 atmospheres of initial nitrogen pressure at a temperature in the range of from about 170° to about 200° C. for a period of about 2 hours, meanwhile continuously stirring the reactants. At the end of this time the autoclave is cooled to room temperature and the reaction mixture is then subjected to fractional distillation. The cut comprising 4,4,5-trichlorocyclohexene is separated out.

The 4,4,5-trichlorocyclohexene obtained in the above paragraph is partially dechlorinated by subjecting said compound to the action of a dehalogenating agent prepared by adding iodine to a stirred mixture of magnesium turnings in absolute ether at room temperature. The 4,4,5-trichlorocyclohexene is slowly added to a continuously stirred mixture of the dehalogenating agent after which the stirring is continued for an additional 2 hours while maintaining the temperature at approximately 30° C. At the end of this time the stirring is discontinued, the product is treated with water and the ether layer is separated, washed, dried and distilled, the cut comprising 1-chloro-1,4-cyclohexadiene being recovered therefrom.

Example III

A mixture of isoprene and trans-dibromoethylene is treated in a manner similar to that set forth in Examples I and II above. Upon fractional distillation of the reaction product, a cut comprising 4,5-dibromo-1-methylcyclohexane is separated out and treated with a dehalogenating agent comprising magnesium and magnesium iodide in the presence of anhydrous ethyl ether. The reaction product comprising 1-methyl-1,4-cyclohexadiene is separated from the unreacted starting materials by fractional distillation.

I claim as my invention:

1. A process for the preparation of a non-conjugated cycloalkadiene from a polyhalocycloalkene resulting from the reaction of a conjugated alkadiene with a polyhaloalkene having the general formula:

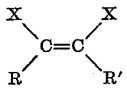

in which R and R' are independently selected from the group consisting of hydrogen, halogen and alkyl radicals and X is a halogen radical, which comprises at least partially dehalogenating said polyhalocycloalkene in the presence of magnesium and magnesium iodide, and recovering the resultant non-conjugated cycloalkadiene.

2. The process of claim 1 further characterized in that said polyhaloalkene is a polychloroolefin.

3. The process of claim 1 further characterized in that said polyhaloalkene is a polybromoolefin.

4. The process of claim 1 further characterized in that said conjugated alkadiene is butadiene.

5. The process of claim 1 further characterized in that said conjugated alkadiene is isoprene.

6. A process for the preparation of 1,4-cyclohexadiene which comprises dechlorinating trans-4,5-dichlorocyclohexene in the presence of magnesium plus magnesium iodide, and recovering the resultant 1,4-cyclohexadiene.

7. A process for the preparation of 1,4-cyclohexadiene which comprises dechlorinating trans-4,5-dichlorocyclohexene in the presence of magnesium plus magnesium iodide in ether, and recovering the resultant 1,4-cyclohexadiene.

8. A process for the preparation of 1-methyl-1,4-cyclohexadiene which comprises dechlorinating 1-methyl-trans-4,5-dichlorocyclohexene in the presence of magnesium plus magnesium iodide in ether, and recovering the resultant 1-methyl-1,4-cyclohexadiene.

9. A process for the preparation of 1-chloro-1,4-cyclohexadiene which comprises partially dechlorinating 4,4,5-trichlorocyclohexene in the presence of magnesium plus magnesium iodide in ether, and recovering the resultant 1-chloro-1,4-cyclohexadiene.

References Cited in the file of this patent

UNITED STATES PATENTS 2,742,506    Maude et al. _____ Apr. 17, 1956

OTHER REFERENCES

Tishchenko: Chem. Abs. 33, 4190 (1939).
Fuson et al.: "Jour. Am. Chem. Soc.," vol. 63, pages 2650–2 (1941).
Adams et al.: "Organic Reactions," vol. IV, page 77 (1949).
Wibaut et al.: Rec. Trav. Chim. 69, 1387–92 (1950).